(12) United States Patent
Lopez et al.

(10) Patent No.: US 8,298,114 B2
(45) Date of Patent: Oct. 30, 2012

(54) PLANETARY GEAR ASSEMBLY

(75) Inventors: Fulton J. Lopez, Niskayuna, NY (US);
Priyangu Patel, Greenville, SC (US);
Adam Minadeo, Greenville, SC (US)

(73) Assignee: General Electric Company, Niskayuna, NY (US)

( * ) Notice: Subject to any disclaimer, the term of this patent is extended or adjusted under 35 U.S.C. 154(b) by 153 days.

(21) Appl. No.: 12/720,005

(22) Filed: Aug. 13, 2010

(65) Prior Publication Data
US 2011/0136617 A1   Jun. 9, 2011

(51) Int. Cl.
*F16H 57/12* (2006.01)

(52) U.S. Cl. ........................................ 475/347

(58) Field of Classification Search .................. 475/347, 475/346, 348; 74/410, 411
See application file for complete search history.

(56) References Cited

U.S. PATENT DOCUMENTS

| | | | | |
|---|---|---|---|---|
| 1,950,971 A | * | 3/1934 | Chilton | 475/347 |
| 2,095,794 A | * | 10/1937 | Corbin | 475/338 |
| 2,684,591 A | * | 7/1954 | Lundquist | 73/862.31 |
| 2,868,040 A | * | 1/1959 | Chamberlin | 475/92 |
| 2,971,407 A | | 2/1961 | Katz | |
| 3,257,869 A | * | 6/1966 | Sharples | 475/347 |
| 3,303,713 A | * | 2/1967 | Hicks | |
| 3,943,787 A | * | 3/1976 | Hicks | 74/410 |
| 3,964,334 A | * | 6/1976 | Hicks | 475/347 |
| 4,090,416 A | | 5/1978 | Hicks | |
| 4,141,424 A | * | 2/1979 | Murayama et al. | 180/53.2 |
| 4,193,325 A | | 3/1980 | Cotreau | |
| 5,700,218 A | | 12/1997 | VanSelous | |
| 6,770,007 B2 | | 8/2004 | Fox | |
| 7,297,086 B2 | | 11/2007 | Fox | |
| 7,537,537 B2 | | 5/2009 | Smet | |
| 2007/0099746 A1 | * | 5/2007 | Hahlbeck | 475/331 |
| 2008/0269007 A1 | | 10/2008 | Cunliffe | |
| 2009/0163316 A1 | | 6/2009 | Saenz De Ugarte | |
| 2009/0270216 A1 | * | 10/2009 | Poon et al. | 475/178 |

FOREIGN PATENT DOCUMENTS

| DE | 23 39 882 | * 2/1975 |
|---|---|---|
| DE | 2339882 A1 | 2/1975 |

OTHER PUBLICATIONS

Search Report from corresponding EP Application No. 11176507.9-1254 dated Oct. 25, 2011.

\* cited by examiner

*Primary Examiner* — Sherry Estremsky
(74) *Attorney, Agent, or Firm* — Ann M. Agosti

(57) ABSTRACT

A planet gear assembly, including: a planet pin; a bearing comprising an inner race secured to the planet pin at a planet pin bearing end; a planet gear; and a compliant annular plate arranged to secure the planet gear to the planet pin. Compliance of the annular plate permits rotation of the planet gear when a planet gear axis of rotation is not coincident with an axis of rotation of a portion of the planet pin in the annular plate.

17 Claims, 6 Drawing Sheets

PLANETARY GEAR ASSEMBLY

FIELD OF THE INVENTION

The present invention is generally related to mounting systems for gears. In particular, the invention is related to compliant mounts for gears commonly used in a planetary gear assembly.

BACKGROUND OF THE INVENTION

Proper alignment of the meshing teeth of adjacent gears is important for the proper distribution of load through a gear train. Involute gear profiles are common in gear systems. As would be seen from a cross section of an involute gear tooth, the tooth is wider at the root and narrows along a specific curve until reaching a flattened tip. The region of the tooth along the specific curve is the face. The face of the tooth is an area from above the root to the tip, along the entire width of the tooth. The face area is the area that contacts the adjacent tooth, which has its own similar face area. The root end of the face of a driving tooth will initially contact/mesh with a tip end of a face of a driven tooth. If one were looking at a cross section of the mesh, this would appear to be at a point of contact, and the point of contact occurs at the moment the meshing gears engage. However, since this occurs along the entire width of the tooth, (from a first end to a second end), it is a line of contact, and the line of contact is formed when the meshing gears engage, and ends when the engagement of those meshing gears ends. As the driving tooth rotates, the line of contact will move from the base end of the driving tooth to the tip end of the driving tooth. The opposite is simultaneously happening on the driven tooth, where the line of contact is moving from the tip end of the face area to the root end of the face area. Once the line of contact of the driving tooth reaches the tip, the meshing teeth disengage and that line of contact ceases for those teeth. The next driving tooth takes over and the process repeats.

In an ideal environment, the axis of rotation of the driving gear and the axis of rotation of the driven gear are parallel, and separated by the proper distance. When the axes are parallel, a first end (along the width) of a driving tooth engages a first end of a driven tooth at the same moment a second end of the driving tooth engages a second end of the driven tooth. In other words, a first end of the line of contact and a second end of the line of contact engage at the same moment in time. It follows then that at the end of that mesh, the first end of the line of contact and the second end of the line of contact disengage at the same time. If the axis are not separated by the proper distance, the face area of driving and driven teeth changes. If the axes are too far apart, the teeth will have less face area to engage, and the face area and line of contact will move toward the tip of the teeth. This results in less engagement time to transfer the same torque, and more stress on the tooth because the engagement force has been moved more to the tip of the tooth. By their nature, involute teeth can handle a certain amount of excess distance, but any variation from "true" may increase stress and may reduce capacity or longevity of the component. True is defined herein as theoretically proper placement. If each component is true, then the entire system would also be true. If the axes are too close, the tip of one tooth will push too far into the region between meshing teeth. This may result in compressive forces on the one tooth, and a force to separate the meshing teeth, simply because there is no extra room between the meshing teeth.

If the axes of rotation are not parallel, i.e. they are angularly misaligned, the axial misalignment is likely to result in a situation where at one end the teeth wish to engage too much, and at the other end the teeth do not engage enough. In other words, the ends of the line of contact may not engage at the same time, and the line of contact may not be parallel to the axes of rotation of both gears. In such a case teeth may realize the consequences of both types of improper axial distances simultaneously, where there may be compressive forces on the first end, and reduced engagement at the second end of the line of engagement. As a result of this uneven distribution of torque, stresses on the teeth may again reduce capacity or longevity.

Situations where the axes of rotation are not the proper distance apart can result from simple manufacturing tolerances, where the bearing of one of the gears, which permits the gear to rotate, was manufactured/installed in a position other than the "true" position that would result in the proper distance apart. The same can be said of angular misalignment of the axes if, for example, the bearing was installed at an improper angle. Minimal misalignments can result in dramatic differences between an intended (i.e. "true") load distribution, where there is no stress gradient through the line of contact because of proper meshing of gears, and the actual load distribution, which may have significant stress gradients, even when the products are manufactured according to specifications. Angular misalignment may also occur under torque load, where the carrier plate to which the planet is attached may urge a planet pin forward at the planet pin's base, but movement of the opposite end of the planet pin, to which the gear may be attached is resisted by downstream gears. This may result in a cantilever effect on the planet pin, where one end of the planet pin may lead the other, or trail the other if the load directions are reversed.

The above describes simple, two gear systems. Gear systems, however, are rarely that simple. Often, as is in the case of planetary gears, a gear may have more than one meshing/adjacent gear. In such cases, misalignments may have a cumulative effect, exacerbating the problem.

Stress gradients require manufacturers to design and build for the worst case scenario. As a result, manufactures have to design and build to the highest stress, although much of the system may not see these high levels of stress. For example, if stresses in the first end of the tooth are greater than the second end due to axial misalignment, the entire tooth must be designed and built to withstand the forces present only on the first end. This results in more expensive and heavier components, much of which is not properly utilized. Recognizing this, manufacturers have an interest in more uniform load distribution through the components. More uniform load distributions permit greater torque to be transmitted using the beefier components, or enable the manufacturer to build a leaner product that delivers the same torque as a product with greater stress gradients.

In an effort to reduce these stress gradients manufacturers have sought ways to reduce misalignment of meshing gears. One approach has been to mount one gear on a flexible shaft. Such an approach permits a gear that is mounted too close to another to be pushed away slightly, but that may result in axial misalignment of the meshing gears. Another approach involves a flexible planet pin mounted at one end, a gear mounted on the other end, and a weakened area in between. In this approach the planet pin flexes and the weakened area permits the gear to adjust, but in this approach the available adjustment of one end of the gear teeth is significantly different than the available adjustment of the other end of the gear teeth. Further, other mechanical configurations can be utilized. As such, there remains room for improvements in the art.

BRIEF DESCRIPTION OF THE INVENTION

A first embodiment is directed toward a planet gear assembly, including: a planet pin; a bearing comprising an inner race secured to the planet pin at a planet pin bearing end; a planet gear; and a compliant annular plate arranged to secure the planet gear to the planet pin. Compliance of the annular plate permits rotation of the planet gear when a planet gear axis of rotation is not coincident with an axis of rotation of a portion of the planet pin in the annular plate.

A second embodiment is directed toward a geared planetary system including: a bearing disposed in a carrier and comprising an inner race; a planet pin comprising a planet pin bearing end fixed to the inner race; an annular plate fixed to the planet pin; and a planet gear fixed to a radially outermost surface of the annular plate. The annular plate is arranged to deform when a planet pin bearing end axis of rotation does not coincide with a preferred planet gear axis of rotation, and in response to a deformation of the annular plate an actual planet gear axis of rotation is positioned to coincide with the preferred planet gear axis of rotation.

Another embodiment is directed toward a planet gear assembly, including: a planet pin; a bearing comprising an inner race secured to the planet pin at a planet pin bearing end; a planet gear; and a compliant annular plate disposed radially between the planet pin and the planet gear and arranged to secure the planet gear to the planet pin. The compliant annular plate through its compliance permits the planet gear to rotate about a planet gear axis of rotation that is different than a planet pin bearing end axis of rotation.

BRIEF DESCRIPTION OF THE DRAWINGS

The invention is explained in the following description in view of the drawings that show.

DETAILED DESCRIPTION OF THE INVENTION

The present inventors have developed a new configuration for a gear that will enable a gear to remain as close as possible to being parallel to an adjacent gear despite improper axial placement (i.e. the axes are too near or too far from each other), or improper axial alignment, (i.e. the axes are not parallel), or a combination of both. The new configuration will permit the gear to remain parallel whether the improper axial placement or alignment is the result of manufacturing tolerance or loading and twisting of components when the system is operating.

Figure 1:
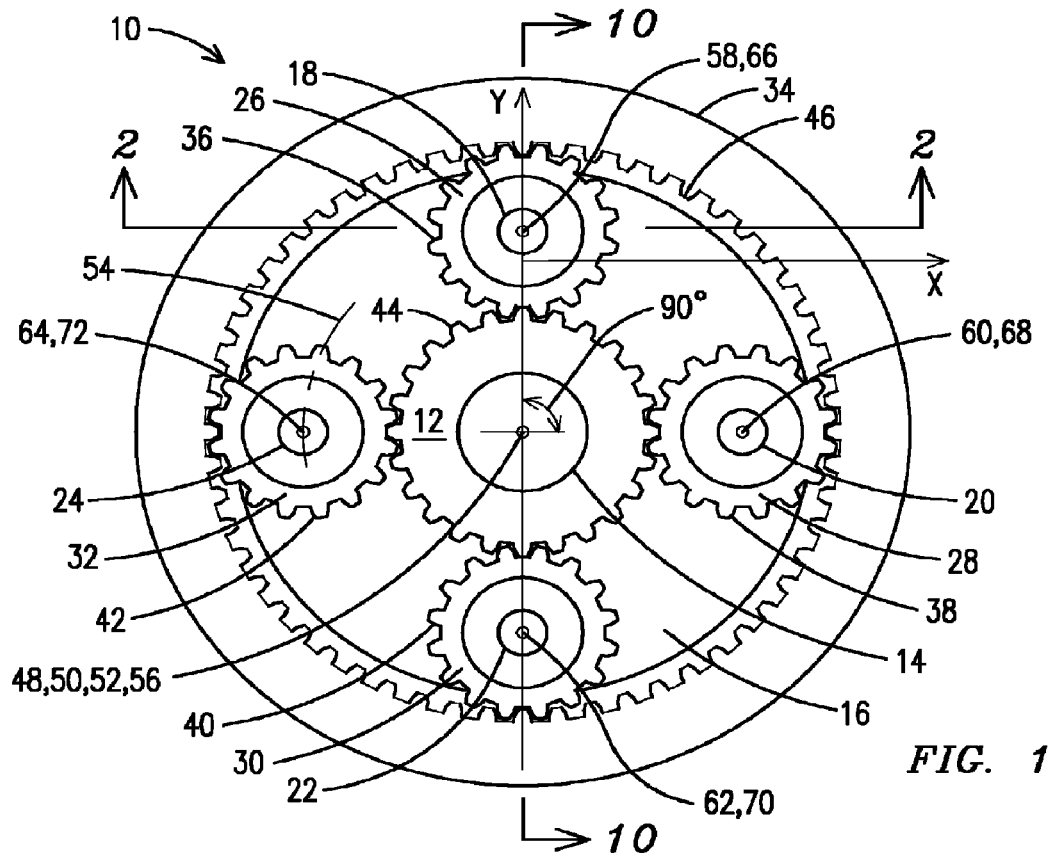
FIG. 1 is a view of a common planetary gear system with four planets.

Turning to the drawings, FIG. 1 shows a common four-planet planetary gear system 10 in which the present assembly can be used. This configuration is one of many possible configurations and is meant to be for purposes of illustration and not to be limiting. For example, this design could be used for stationary or rotating ring gears, and carriers etc. Further, a carrier plate could be a carrier housing with a plate on both ends of the planet pin, where the plates are connected to each other, for example, via a member between their perimeters. Such a configuration could benefit from the assembly described herein as a result of, for example, twisting of one plate with respect to the other about the common axis of rotation due to torque load.

In an embodiment, the center is a sun gear 12 which may be fixed to or an integral part of an output shaft 14. The carrier plate 16 may be connected to an input shaft (not shown). Carrier plate 16 may have four equally spaced planet pins 18, 20, 22, 24 on which planet gears 26, 28, 30, 32 rotate. Planet gears 26, 28, 30, 32 mesh with sun gear 12 and ring gear 34. It can be seen that if input shaft (not shown) is rotated clockwise and ring gear 34 is fixed, carrier plate 16 will rotate the planet pins 18, 20, 22, 24 clockwise around the sun gear. Planet gears 26, 28, 30, 32 will rotate counter clockwise with respect to their respective planet pins 18, 20, 22, 24, due to meshing of planet gear teeth 36, 38, 40, 42 with ring gear teeth 46, and will cause the sun gear 12 and output shaft 14 to rotate clockwise, due to meshing of the planet gear teeth 36, 38, 40, 42 with the sun gear teeth 44.

As can be seen from FIG. 1, in an embodiment the output shaft 14 has an output shaft axis of rotation 48. Sun gear 12 has a sun gear axis of rotation 50. Each of the planet pins 18, 20, 22, 24 orbits about a planet pin orbit center 52 along a circular orbit 54, and the ring gear 34 may be fixed, or may rotate about a ring gear axis of rotation 56. If all the components are in their true position, 48, 50, 52, and 56 will coincide, i.e. they will be parallel to each other and in the same place as each other. Planet gears 26, 28, 30, 32 rotate about respective planet gear axes of rotation 58, 60, 62, 64. If the planet pins 18, 20, 22, 24 are in their true position, then planet gear axes of rotation 58, 60, 62, 64 will coincide with respective planet pin longitudinal axes 66, 68, 70, 72. In such a case, the planet gear axes of rotation 58, 60, 62, 64 would also be a preferred axis of rotation for the planet gear as far as the sun gear is concerned. In other words, in order for a sun gear 12 to mesh with a meshing planet gear, for example planet gear 26 in a true manner, the sun gear prefers the adjacent planet gear 26 be rotating about planet gear preferred axis of rotation. Preferred in this case refers to what the sun gear 12 would prefer for the planet gears 26, 28, 30, 32. Reference is taken to the sun gear 12 because it is common to all the planet gears 26, 28, 30, 32.

In such a true system, every component would be exactly where it is meant to be, and every gear would be properly meshing with adjacent gears. However, such a system rarely occurs. Manufacturing tolerances play a role in untrue positioning of components, as does flexing and twisting of components of the planetary gear system 10 when under load. Manufacturing tolerances, for example, can place a planet pin 18, for example, out of its true in either the radial direction, as indicated by Y, or can place it at an offset, as indicated by X.

Minor radial displacement of one planet pin 18, 20, 22, 24 in an otherwise true four planet system is not a great concern because of the nature of commonly used involute gear teeth. For example, planet gear 26 can tolerate displacement of its planet pin 18 along line Y without great changes in stresses because planet gear teeth 36 will simply engage deeper or shallower with ring gear teeth 46. The involute teeth are generally able to tolerate radial displacements resulting from manufacturing tolerances, and so this rarely presents a problem.

Minor offsets, however, can cause significant problems. Ring gear teeth 46 and sun gear teeth 44 expect planet gear teeth 36, for example, to mesh with them in a certain manner. This happens when planet gear 26 is rotating about its true axis of rotation 58.

If, however, planet pin 18 is offset along line X to the right for example, then planet gear teeth 36 are not where they are supposed to be when true. Ring gear teeth 46 and sun gear teeth 44 will push back on planet gear teeth 36 during engagement because the ring gear teeth 46 and sun gear teeth 44, which are held in relative position by the remaining planets 28, 30, and 32, want planet gear teeth 36 back in their true position to the left. Thus, planet pin 18 deflects to accommodate the offset and resulting tooth misalignment. If the input shaft (not shown) is rotated clockwise, and thus carrier plate 16 is rotated clockwise, planet gear teeth 36 will engage ring gear teeth 46 and sun gear teeth 44 sooner than will planet gear teeth 38. The result is that instead of each planet pin sharing the torque load (load sharing) equally (i.e. each at 25%), the offset planet pin 18 takes on a greater percentage of the torque load, and the somewhat unloaded planet pin 20 is relieved of some of the load, thereby creating a difference in the percentage of the load they share. The inventor's models have shown that in such a system with one offset planet pin, a small offset of 70 μm, (0.0028") resulted in over a 13.42% difference in the load from the loaded offset planet pin 18 to the unloaded planet pin 20. The model used to reach these figures assumed a carrier that fixed both ends of the planet pins so they could not flex/cantilever, and no compliant plate.

Load is transferred to a planet pin via the planet teeth 24, so if the load on the planet pin is greater for the loaded planet pin 18, the load on planet gear teeth 36 is greater for the loaded planet pin 18. If a planet pin is offset and also not parallel, for example due to manufacturing tolerances, the load on the teeth will be distributed unevenly across the teeth, resulting in a stress gradient across the teeth.

Flexible planet pins have been used to allow for untrue placement. However, planet pins naturally want to bend along a curve, but adjacent gears will want to keep a planet gear parallel to them, which is not possible if the planet pin bends along a curve. As a result, the planet pin ends up with an "S" bend, which can be seen in FIG. 2, which is a partial cross section of an offset planet pin 18, planet gear 26, and ring gear 34 along [[A-A]] 2-2 from FIG. 1. It can be seen that planet gear 26 is being pushed into alignment with ring gear teeth 46 and sun gear teeth 44 (not shown) by ring gear teeth 46 and sun gear teeth 44, as a result of offset 79. Ring gear teeth 46 and sun gear teeth 44 essentially need to rotate planet gear 26 clockwise 80 in order to ensure proper tooth alignment. This places great ring gear orienting forces 82 and 84 on the ring gear teeth 46 that engage the planet gear teeth 36. Ring gear orienting forces are shown as dotted lines because they are pushing on the planet gear teeth 36 behind the planet gear 26 in this view, between the planet gear 26 and the ring gear 34. As will be detailed further in FIG. 3, the downwind ring gear orienting force 84 is shown pointing to the right to illustrate that a downwind end of a ring gear tooth 34 may be pushing a downwind end of a planet gear tooth 36 to the right, while an upwind end of a ring gear tooth 34 tooth may be pushing an adjacent planet gear tooth to the left.

Figure 2:
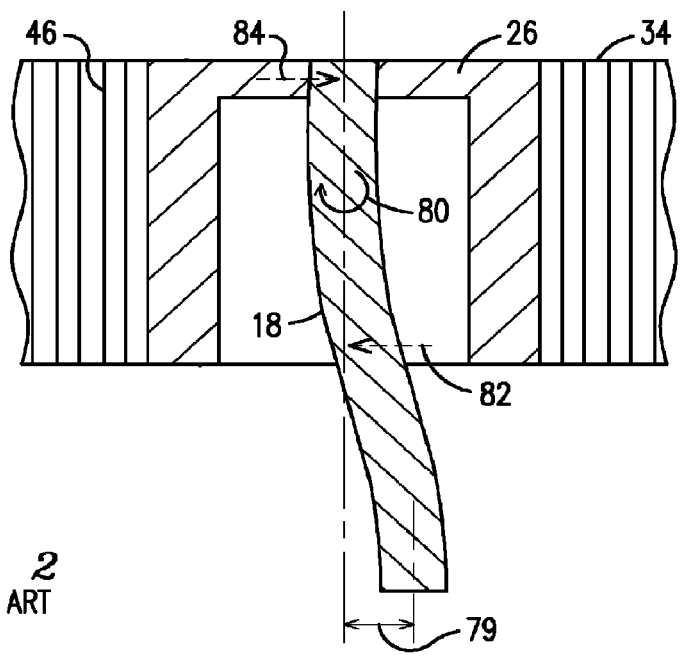
FIG. 2 is a partial cross section of the planetary gear system of FIG. 1, with an offset mounted planet pin.
Figure 3:
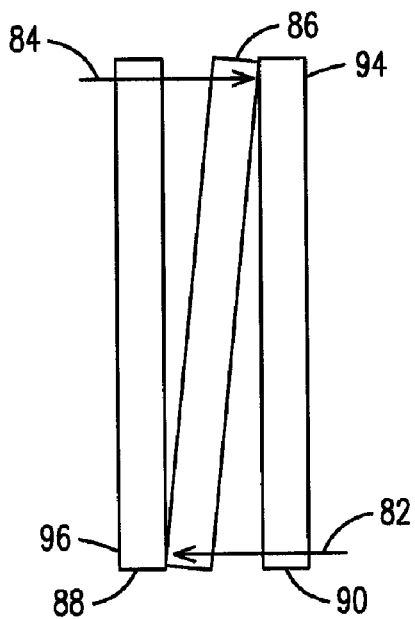
FIG. 3 shows a highly schematic representation of a ring gear tooth interacting with two planet gear teeth of FIG. 2.

FIG. 3 shows an exaggerated schematic of a single ring gear tooth 86 from FIG. 2 as it interacts with two planet gear teeth 88, 90 from FIG. 2, when the system is static. Both planet gear teeth 88, 90 wish to rotate counterclockwise due to the desire of planet pin 18 to follow a simple bend, and not an "S" bend. To keep planet gear 26 as close to parallel as possible to ring gear 34, ring gear tooth 86 must push to the right on the downwind end 94 of planet gear tooth 90, and to the left on upwind end 96 of planet gear tooth 88. As a result, on the outer end of ring gear tooth 86 there is stress of one magnitude and direction, and on the inner end of ring gear tooth 86 there is stress of another magnitude and direction. Clearly, even in a static system there is a stress gradient along both sets of teeth. This stress gradient from this offset remains when the system is under load, in addition to torque load induced stress gradients. (The same occurs for the sun gear teeth 44, where they mesh with the ring gear teeth 36.) The greater the desire of the planet pin to straighten, the greater the stress and corresponding stress gradients.

Figure 4:
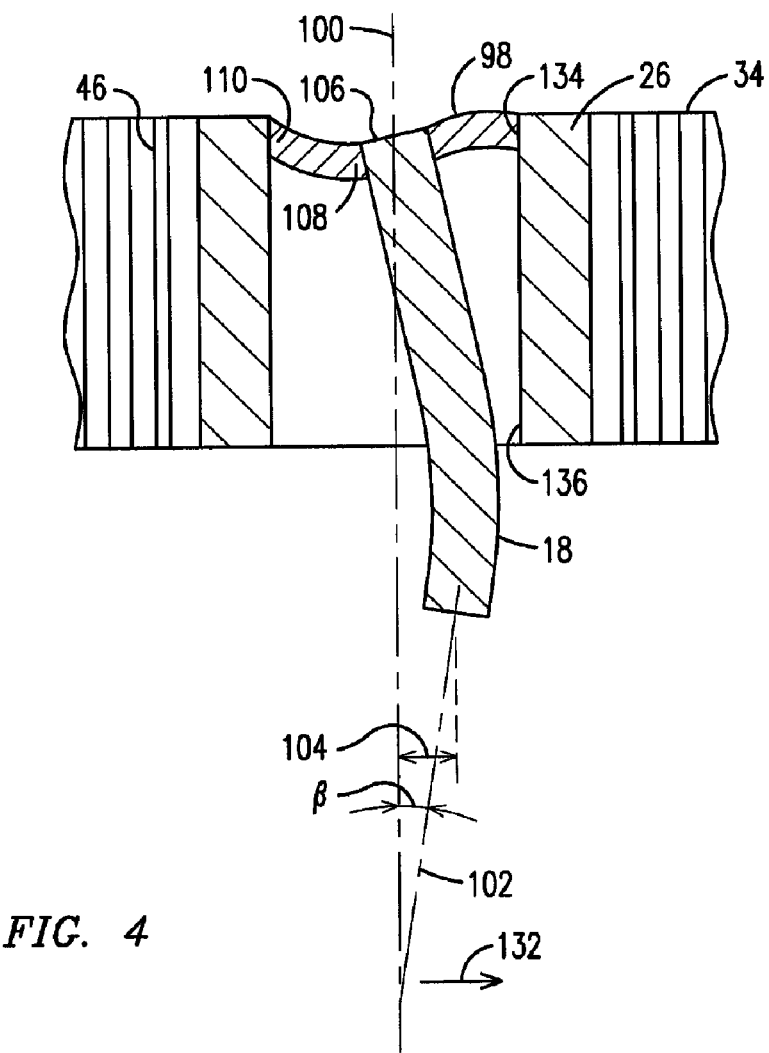
FIG. 4 shows the is a partial cross section of the planetary gear system of FIG. 2, with the compliant plate incorporated.

As seen in FIG. 4, the inventor of the present innovative assembly recognized the increased forces and stresses involved when a planet pin 18 is forced to bend twice into the "S" configuration required by the sun 12 and ring gears 34. In an effort to reduce the stress on the planet pin the inventor has installed a compliant plate 98 between the planet pin 18 and the planet gear 26. Compliant plate 98, due to the nature of a plate, will deform from planar readily, without losing its ability to transfer torque from a plate inner region 108 to a plate outer region 110. (I.e. the plate 98 will readily deform from planar without losing its ability to transfer torque, and do so with minimal radial deformation.) The compliant plate 98 extends the range of motion of the planet gear 26 because it effectively creates an extended lever arm on which the planet gear 26 is mounted. This is so because the compliant plate 98 allows the planet pin 18 to straighten from an "S" bend to a normal bend, by permitting the planet gear 26 to rotate about a planet pin end 106 of the planet pin 18, and thus remain parallel to adjacent meshing gears. This enables the planet gear 26 to move further, or alternately to require less force to reach a certain position than it would without the complaint plate 98. The use of a complaint plate 98 enables a designer to choose different designs and/or materials for the planet pin 18 and the complaint plate 98, providing more room for design choices. The inventor's models have shown that the when the compliant planet pin and plate arrangement disclosed was employed in a four planet gear system with the same small offset of 7 μm, (0.0028") that was tested before, the percentage difference in load sharing dropped from 13.42% to 1.97%. This represents an 85% reduction in the difference.

Compliant plate 98 still enables the planet gear 26 to rotate about a preferred axis of rotation 100 regardless of what type of misalignment is present in the system. Both angular misalignment and displacement are shown to illustrate the point. Angular misalignment is indicated by β and is defined by the angle β at the intersection of a planet pin carrier plate end longitudinal axis 102, and the preferred axis of rotation of the planet gear 100. Displacement misalignment is indicated by 104 and is the distance between the planet pin carrier plate end longitudinal axis 102 from a preferred axis of rotation 100. It can be seen here that it does not matter if the misalignment is an offset due to a manufacturing tolerance, or a cantilever due to a manufacturing tolerance or twisting of the carrier plate, or any other of a myriad of reasons, the planet gear 26 is able to remain parallel to the ring gear 34 and sun gear 12 (not shown) and in fact, it is able to rotate about the very axis the sun gear would prefer it to rotate about 100.

Since each of the planet gears 18 would have this compliant planet pin and plate arrangement, the entire system will be better able to reach an equilibrium state approaching uniform load sharing and uniform load distribution (i.e. no stress gradients) along the face of meshing teeth.

Figure 5:
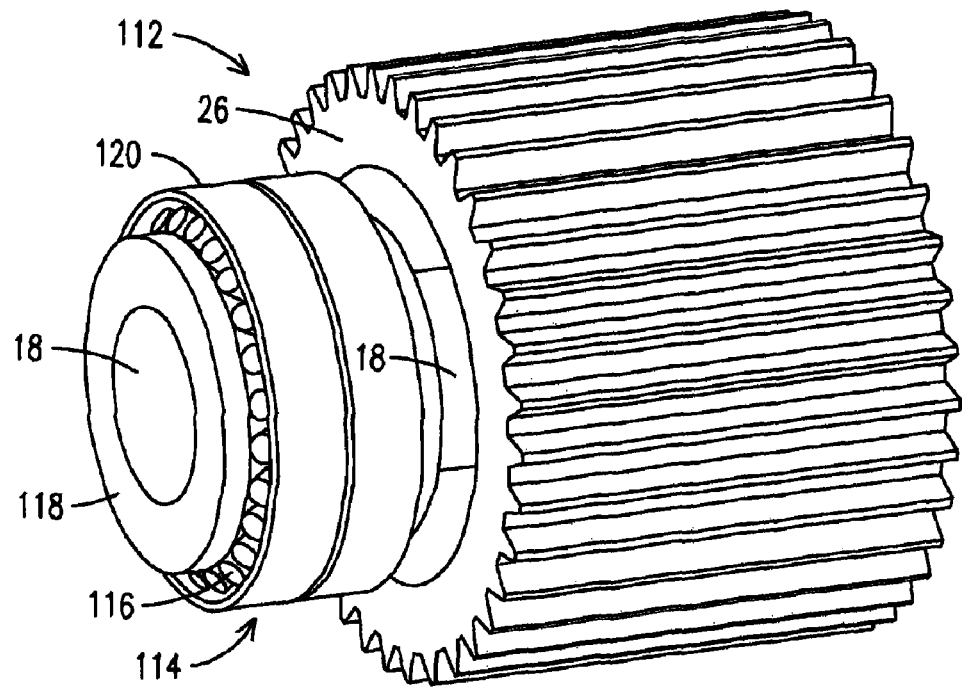
FIG. 5 shows the bearing, planet pin, plate, and planet gear of the present assembly.
Figure 6:
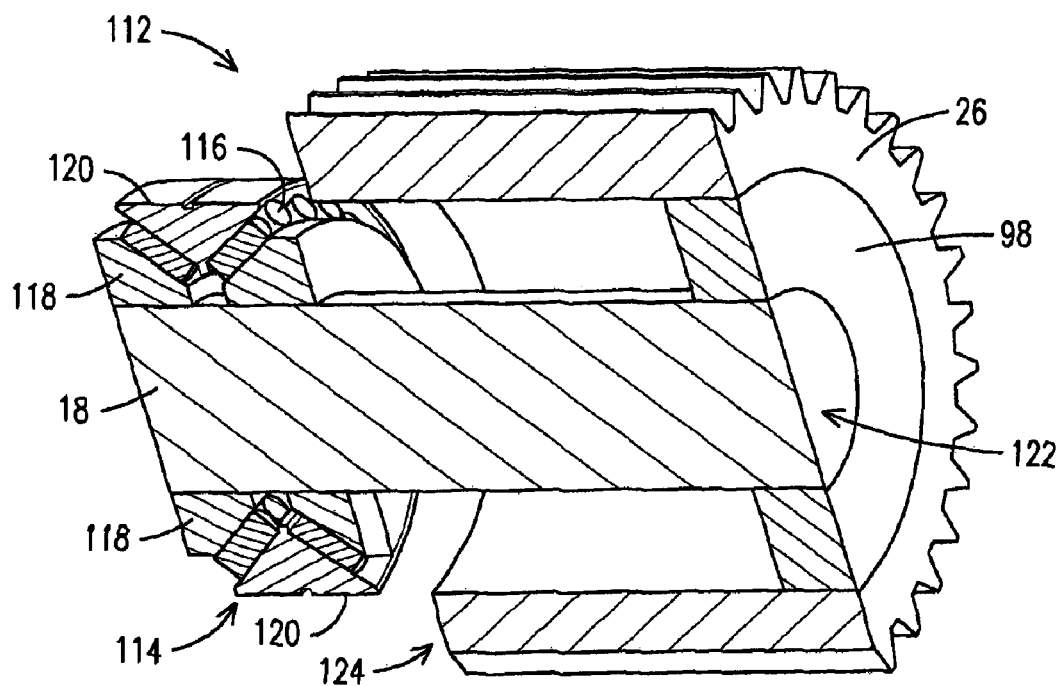
FIG. 6 shows a cutaway of the bearing, planet pin, plate, and planet gear of FIG. 5.

FIGS. 5 and 6 show a view a compliant planet gear assembly 112, including a planet gear 26, compliant plate 98, compliant planet pin 18 and bearing assembly 114. Bearing assembly 114 may include a roller bearing 116, an inner race 118, and an outer race 120. The roller bearing may be a double taper bearing, or any suitable bearing. Inner race 118 may be pressed onto compliant planet pin 18, and the bearing assembly 114 may be secured in a carrier plate (not shown). The outer race 120 may be pressed into the carrier plate, or it may be placed in a pocket and secured by suitable means. The bearing assembly 114 itself may have some compliance designed into it and relied upon as part of the overall compliance of the planet gear assembly 112.

Figure 7:
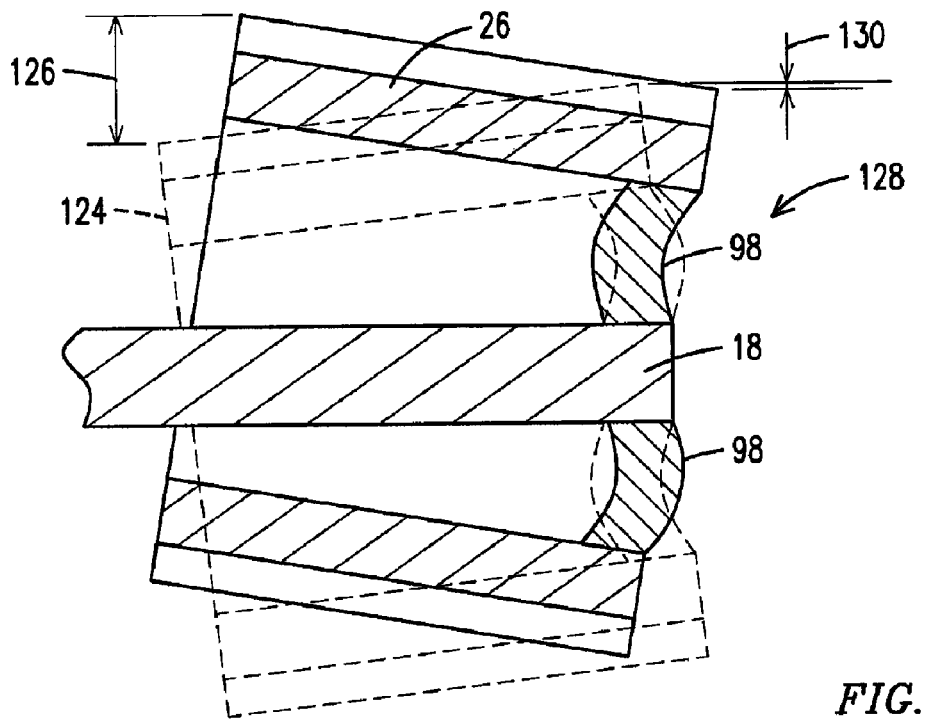
FIG. 7 shows the range of positions of the ends of the gear teeth for one embodiment.

In this embodiment it is seen that planet plate 98 is disposed between the planet pin 18 and the planet gear 26 at a planet pin gear end 122. This permits maximum compliance of the planet pin 18. As shown in FIG. 7, in this configuration the planet gear carrier end 124 has a wide carrier end range of motion 126 compared to the planet gear distal end 128 that has a narrow distal end range of motion 130. Such a configuration permits a wide range of positions for the planet gear 26, but it also allows for a large stress gradient from one end of a tooth to another end. This is because the same flexibility that permits motion also fails to transmit torque as well when compared to an inflexible mount. For example, in the example from FIG. 4, once torque is applied to the carrier, planet pin is urged in direction 132. The torque will be transferred through the planet pin 18 to the planet gear 26 via compliant plate 98. The gear plate 98 is at the furthest point on the planet pin 18 possible, and thus planet pin 18 will cantilever. The compliant plate 98 directly supports the planet gear teeth 36 at the planet gear distal end 134, but does not directly support the planet gear teeth 36 at the planet gear carrier end 136. Thus, force will not be distributed evenly over the planet gear teeth 36 as the carrier begins to apply torque.

Figure 8:
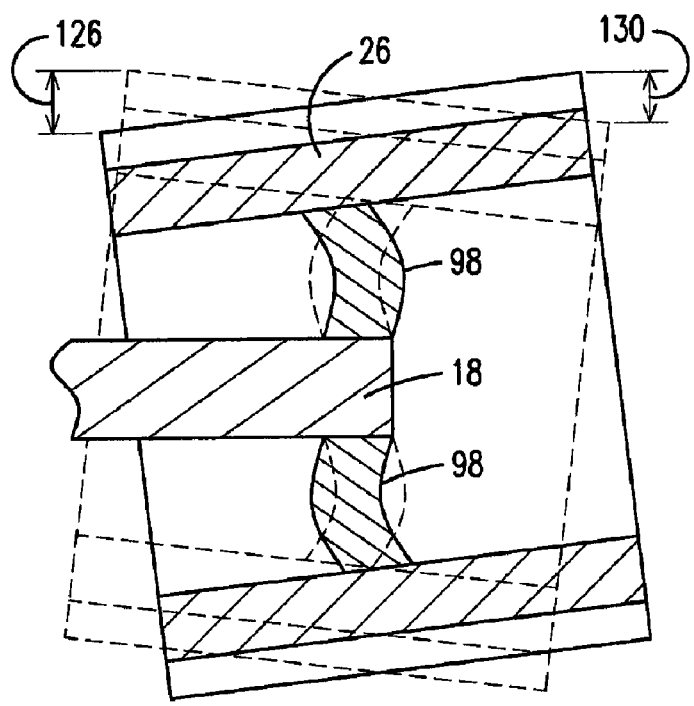
FIG. 8 shows the range of positions of the ends of the gear teeth for another embodiment.

In an alternate embodiment shown in FIG. 8, compliant plate 98 is disposed mid way between the ends of the planet gear. Opposite the prior configuration, such a configuration may result in a smaller but more equal range of positions 126, 130 for the planet gear 26, but it also allows for a smaller stress gradient from one end of a tooth to another end. The range of positions may be smaller because compliant plate 98 is not as far out on the planet pin 98, so it will cantilever less. The stress gradient will be smaller because the planet gear 26 is supported in the middle and as a result is more likely to spread any torque load more evenly along the width of a tooth.

Figure 9:
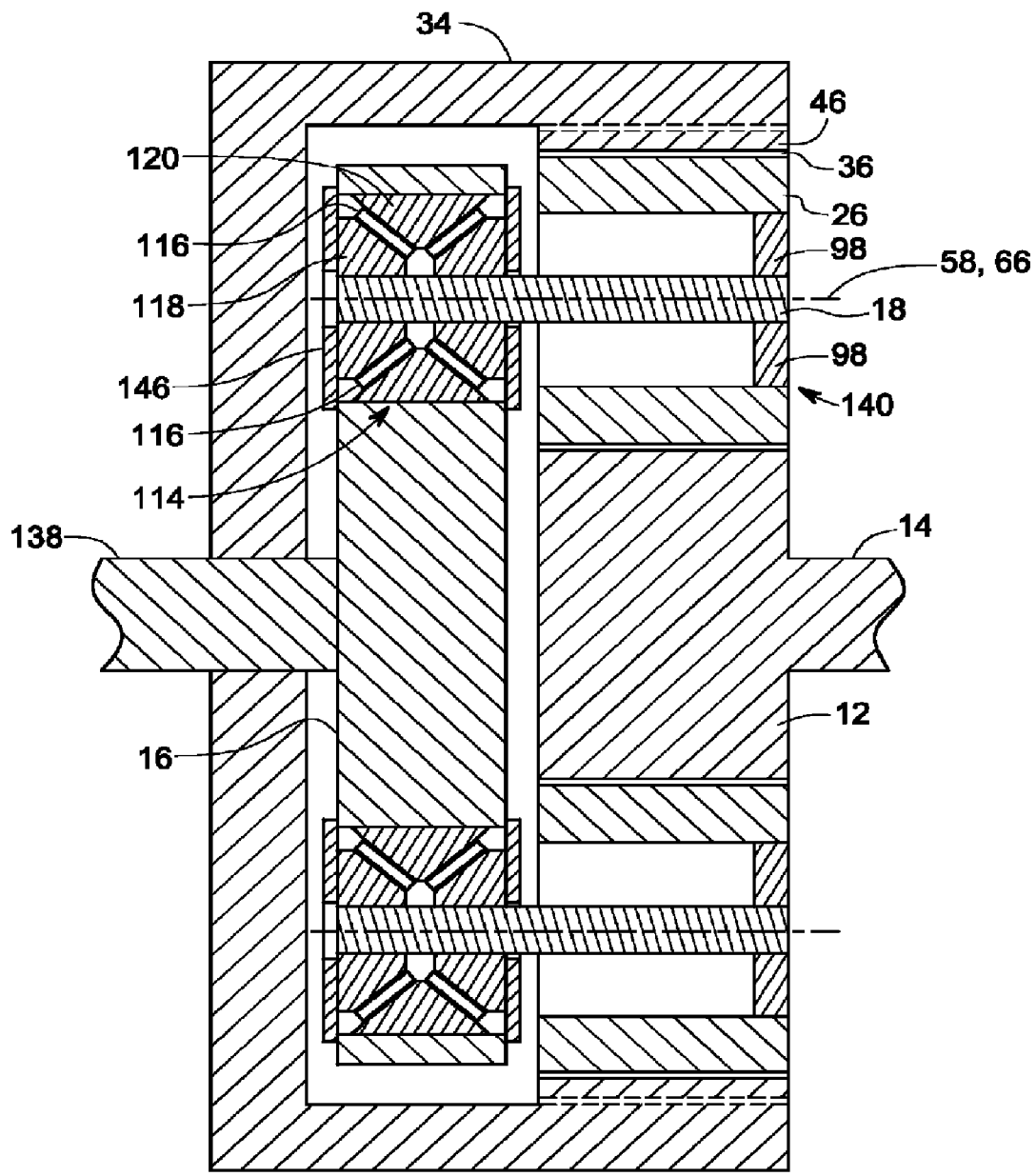
FIG. 9 shows the bearing, planet pin, plate, and planet gear of FIG. 5 in the common planetary gear system with four planets of FIG. 1.
Figure 10:
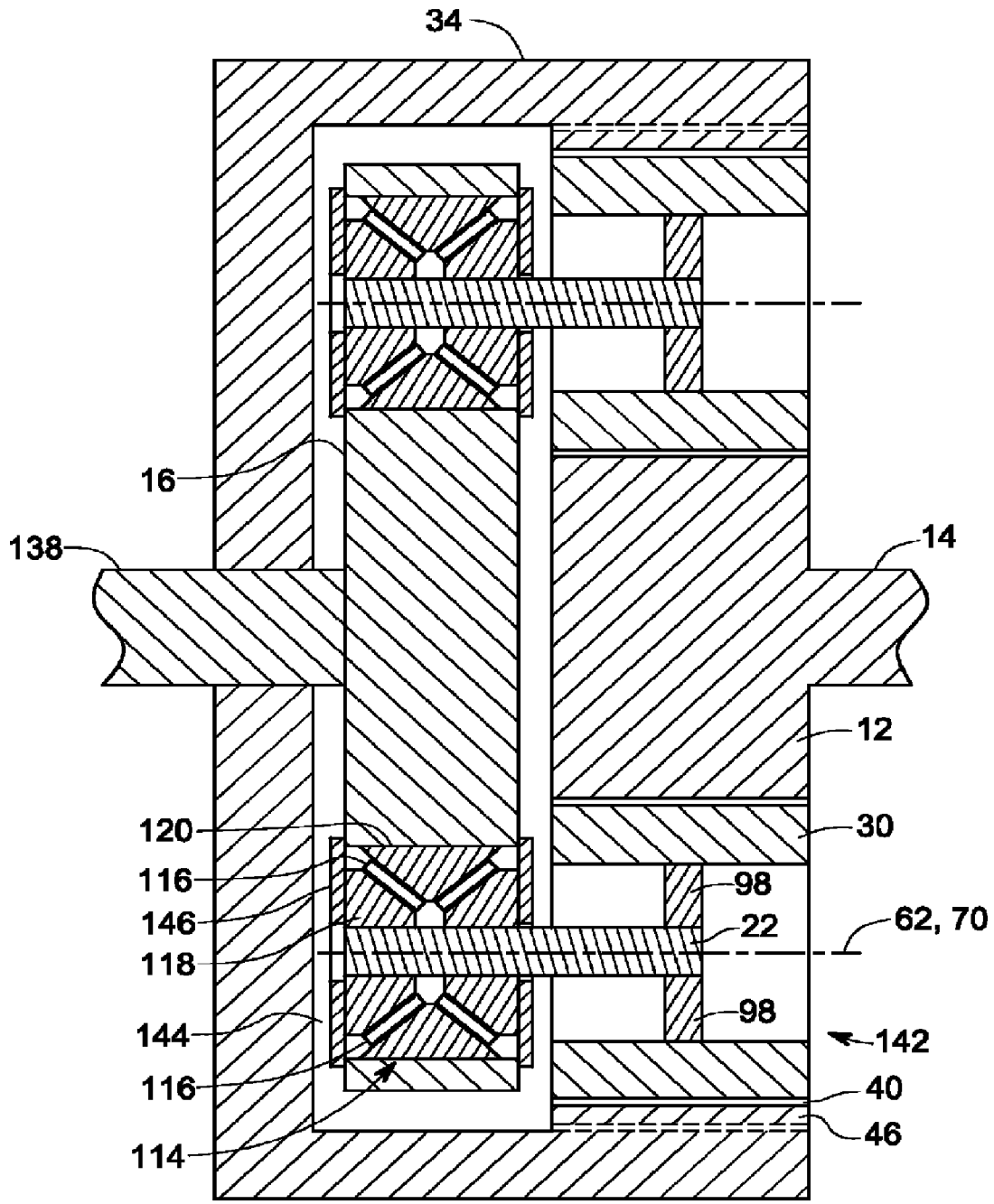
FIG. 10 shows an alternative embodiment of the bearing, planet pin, plate, and planet gear of FIG. 5 in the common planetary gear system with four planets of FIG. 1.

FIG. 9 shows the cross section 10-10 of a true four planet gear system 10 of FIG. 1, with one embodiment 140 of the present invention. Further, FIG. 10 shows the cross section 10-10 of a true four planet gear system 10 of FIG. 1, with another embodiment 142 of the present invention. Referring to FIG. 9 and FIG. 10, visible are output shaft 14, sun gear 12, carrier plate 16, inner bearing races 118, bearings 116, outer bearing races 120, planet pins 18, 22, plates 98, planet gears 26, 30, ring gear 34, and input shaft 138. Bearing assemblies 114 can be press fit into recesses 144, or secured therein via securing means 146.

The inventors of the present assembly have recognized a limitation of the prior art and improved upon it with the addition of a low cost, easy to incorporate compliant element. This element reduces maximum stresses on a planet pin, reduces the variation in loads each planet pin of a planet system may encounter, decreases the maximum stresses meshing gear teeth encounter, and reduces the stress gradients along those teeth. As a result, gear trains using the innovative design can transfer more torque than identical prior art systems without the innovation, or new systems can be designed to transfer the same amount of torque while weighing and costing less. The inventor's models suggest a 10%-14% increase in torque capacity, and a 17% increase in torque density (the amount of torque that can be transferred per unit weight of the gearbox) as a result of incorporating the plate in the innovative design.

While various embodiments of the present invention have been shown and described herein, it will be apparent that such embodiments are provided by way of example only. Numerous variations, changes and substitutions may be made without departing from the invention herein. Accordingly, it is intended that the invention be limited only by the spirit and scope of the appended claims.

The invention claimed is:

1. A planet gear assembly, comprising:
   a planet pin;
   a bearing comprising an inner race secured to the planet pin at a planet pin bearing end;
   a planet gear; and
   a single compliant annular plate arranged to secure the planet gear to the planet pin, wherein compliance of the annular plate permits rotation of the planet gear when a planet gear axis of rotation is not coincident with an axis of rotation of a portion of the planet pin in the annular plate.

2. The planet gear assembly of claim 1, wherein the compliance of the annular plate permits the planet gear axis of rotation to be parallel with the axis of rotation of the portion of the planet pin in the annular plate.

3. The planet gear assembly of claim 1, wherein compliance of the planet pin aids in permitting rotation of the planet gear when the planet gear axis of rotation is not coincident with the axis of rotation of a portion of the planet pin in the annular plate.

4. The planet gear assembly of claim 1, wherein the annular plate is disposed at a planet gear end away from the bearing.

5. The planet gear assembly of claim 1, wherein the annular plate is disposed inward from planet gear ends.

6. The planet gear assembly of claim 1, wherein the annular plate is disposed midway between the planet gear ends.

7. The planet gear assembly of claim 1, wherein the bearing is a roller bearing.

8. A geared planetary system comprising:
   a bearing disposed in a carrier and comprising an inner race;
   a planet pin comprising a planet pin bearing end fixed to the inner race;
   an annular plate fixed to the planet pin; and
   a planet gear fixed to a radially outermost surface of the annular plate,
   wherein the annular plate is arranged to deform when a planet pin bearing end axis of rotation is not the same as a preferred planet gear axis of rotation, and in response to a deformation of the annular plate an actual planet gear axis of rotation is positioned to be the same as the preferred planet gear axis of rotation and wherein the planet pin also deforms to aid in making the actual axis of rotation of the planet gear the same as the preferred planet gear axis of rotation.

9. The geared planetary system of claim 8, wherein the deformation of the annular plate permits the actual planet gear axis of rotation to be parallel to an axis of rotation of a meshing gear.

10. The geared planetary system of claim 8, wherein the annular plate is disposed at a planet gear end away from the bearing.

11. The geared planetary system of claim 8, wherein the annular plate is disposed inward from planet gear ends.

12. The geared planetary system of claim 8, wherein the bearing is a double taper roller bearing.

13. A planet gear assembly, comprising:
a planet pin;
a bearing comprising an inner race secured to the planet pin at a planet pin bearing end;
a planet gear; and
a compliant annular plate disposed radially between the planet pin and the planet gear and arranged to secure the planet gear to the planet pin, the compliant annular plate through its compliance permits the planet gear to rotate about a planet gear axis of rotation that is different than a planet pin bearing end axis of rotation and wherein the planet pin is also compliant, and wherein compliance of the planet pin and compliance of the annular plate together permit the planet gear to rotate about the planet gear axis of rotation that is different than the planet pin bearing end axis of rotation.

14. The planet gear assembly of claim 13, wherein the planet gear axis of rotation is parallel to an axis of rotation of a meshing gear to reduce stress gradients along a length of the planet gear when the planet gear axis of rotation is different than the planet pin bearing end axis of rotation.

15. The planet gear assembly of claim 13, wherein the planet gear axis of rotation is parallel to an axis of rotation of a meshing gear when the planet gear axis of rotation is different than the planet pin bearing end axis of rotation.

16. The planet gear assembly of claim 13, wherein the bearing is a roller bearing.

17. A planet gear assembly, comprising:
a planet pin;
a bearing comprising an inner race secured to the planet pin at a planet pin bearing end;
a planet gear; and
a compliant annular plate arranged to secure the planet gear to the planet pin, wherein compliance of the annular plate permits rotation of the planet gear when a planet gear axis of rotation is not coincident with an axis of rotation of a portion of the planet pin in the annular plate and wherein compliance of the planet pin aids in permitting rotation of the planet gear when the planet gear axis of rotation is not coincident with the axis of rotation of a portion of the planet pin in the annular plate.

* * * * *

UNITED STATES PATENT AND TRADEMARK OFFICE
CERTIFICATE OF CORRECTION

| | | |
|---|---|---|
| PATENT NO. | : 8,298,114 B2 | Page 1 of 1 |
| APPLICATION NO. | : 12/720005 | |
| DATED | : October 30, 2012 | |
| INVENTOR(S) | : Lopez et al. | |

It is certified that error appears in the above-identified patent and that said Letters Patent is hereby corrected as shown below:

In Column 3, Line 42, delete "shows the is a" and insert -- is a --, therefor.

In Column 5, Line 51, delete "[[A-A]] 2-2" and insert -- 2-2 --, therefor.

In Column 6, Line 47, delete "7μm," and insert -- 70μm, --, therefor.

Signed and Sealed this
First Day of January, 2013

David J. Kappos
*Director of the United States Patent and Trademark Office*